(12) United States Patent
Minakuti et al.

(10) Patent No.: US 6,762,863 B1
(45) Date of Patent: Jul. 13, 2004

(54) FILM SCANNING SYSTEM

(75) Inventors: Jun Minakuti, Sakai (JP); Satoshi Deishi, Ibaraki (JP); Yukari Nakai, Osaka (JP)

(73) Assignee: Minolta Co., Ltd., Osaka (JP)

( * ) Notice: Subject to any disclaimer, the term of this patent is extended or adjusted under 35 U.S.C. 154(b) by 556 days.

(21) Appl. No.: 09/708,610

(22) Filed: Nov. 9, 2000

(30) Foreign Application Priority Data

Nov. 12, 1999 (JP) .......................................... 11-322967

(51) Int. Cl.[7] .............................................. H04N 1/04
(52) U.S. Cl. ...................... 358/487; 358/518; 358/523
(58) Field of Search ................................ 358/474, 487, 358/501, 505, 513, 530, 518, 523

(56) References Cited

U.S. PATENT DOCUMENTS 4,958,220 A * 9/1990 Alessi et al. .................. 358/76
5,751,343 A * 5/1998 Hibino et al. ................. 348/96

* cited by examiner

Primary Examiner—Kimberly Williams
Assistant Examiner—Negussie Worku
(74) Attorney, Agent, or Firm—McDermott Will & Emery LLP

(57) ABSTRACT

A user inputs whether a reading object film is negative film, positive film, or monochrome film. A suitable profile for use in color matching is selected based on this input.

14 Claims, 15 Drawing Sheets

FILM SCANNING SYSTEM

This application is based on Patent Application No. 11-322967 filed in Japan, the content of which is hereby incorporated by reference.

BACKGROUND OF THE INVENTION

1. Field of the Invention

The present invention relates to a film scanning system and a storage medium recorded color matching program. The present invention particularly relates to a film scanning system and a storage medium recorded color matching program capable of color matching in accordance with film characteristics.

2. Description of the Related Art

In recent years, image digitalization has progressed rapidly in recent years due to the popularization of personal computers and digital cameras. On the other hand, images photographed using conventional analog silver halide film cameras can be practically digitized, and film scanners can be effectively used for this purpose.

Color matching art for matching colors among devices has become extremely desirably in conjunction with the colorization of so many imaging devices. Image input devices including film scanners are not exceptions, and color matching an original film image and the image displayed on a CRT is desirable when an input image is displayed on an output device such as a CRT (cathode ray tube) or the like. For this reason the color matching function often has been provided in film scanners in recent years.

In systems capable of incorporating various input and output devices, a means is required for knowing the characteristics of the connected devices in order to realize color matching. Such a means is being determined in a scheme using a file recording device characteristics (profiles) in a format called the ICC profile determined by the international color consortium (ICC).

In the case of a film scanner, the input film (i.e., film to be processed) may be a positive film or a negative film. Positive film is itself the ultimately appreciated medium, and there is no particular problem in color matching the film as a target. However, negative film is only an intermediate medium which is printed on printing paper, and color matching the film as a target is meaningless. The color matching process is particularly meaningless because there is no color in a monochrome negative film. Such a meaningless process increases the time required for image processing.

In scanners provided with a conventional color matching function, when color negative film is processed, a color balance process is executed to reverse the tones of the read image and correct the coloring of the negative beforehand to improve color reproducibility. In addition to these processes, a color matching process is performed for color conversion. However, the various processes performed for positive film are also directly performed for negative film. Since the tone characteristics are obviously opposite for positive film and negative film, the spectral characteristics of the coloring matter used also differ. For this reason correct color matching cannot be attained when using the processes of positive film directly for negative film. Furthermore, A result of performing the color matching process makes it unclear relative to what the color matching was performed.

On the other hand, when processing negative film in the case of scanners which are not provided with a color matching function, the tones are reversed, and a color balance correction process is performed. Although a sufficiently appreciable image may be obtained by such processes, color matching cannot be completely ensured.

Accordingly, in the conventional art, meaningful color matching is not provided when reading color negative film whether the scanner is provided with a color matching function or the scanner is not provided with a color matching function.

An object of the present invention is to provide a film scanning system and recorded medium recorded color matching program capable of suitable color matching in accordance with film type.

SUMMARY OF THE INVENTION

These objects are attained by the film scanning system of the present invention comprising film scanner for scanning an image recorded on the film; a discriminator for discriminating a type of film; a selector for selecting a profile for use in color matching based on the discrimination result of the discriminator; and image processor for performing the color matching based on the selected profile.

These objects are further attained by a storage medium on which is stored a program implementing the steps of: discriminating a type of film to be scanned; selecting a profile for use in color matching based on the discrimination result in the discrimination step; scanning an image recorded on the film; and performing the color matching based on the profile selected in the selection step.

In the following description, like parts are designated by like reference numbers.

DESCRIPTION OF THE PREFERRED EMBODIMENTS

First Embodiment

The film scanning system and storage medium recorded color matching program of the first embodiment of the present invention are described hereinafter. In the present embodiment, whether or not the processing object film is a negative film or a positive film or a monochrome film is discriminated, and the profile used for color matching is changed based on the discrimination result.

If considering an intermediate medium for obtaining a print image from a negative film, the ultimate target image is an image printed on paper, and the color matching target is equivalent to the print image.

In conventional image input devices which perform color matching using a device profile such as an ICC profile, only one type of profile is used which records the tone characteristics and spectral characteristics of the device. However, in the case of a film scanner, the tone characteristics of the film are reversed for positive and negative films, and since spectral characteristics differ depending on the film type, it is desirable to prepare a profile recording characteristics which consider both device characteristics and film characteristics in accordance with film type. In the present embodiment, two profiles are prepared for use with negative film and positive film, and a profile is selected in accordance with the film.

Figure 1:
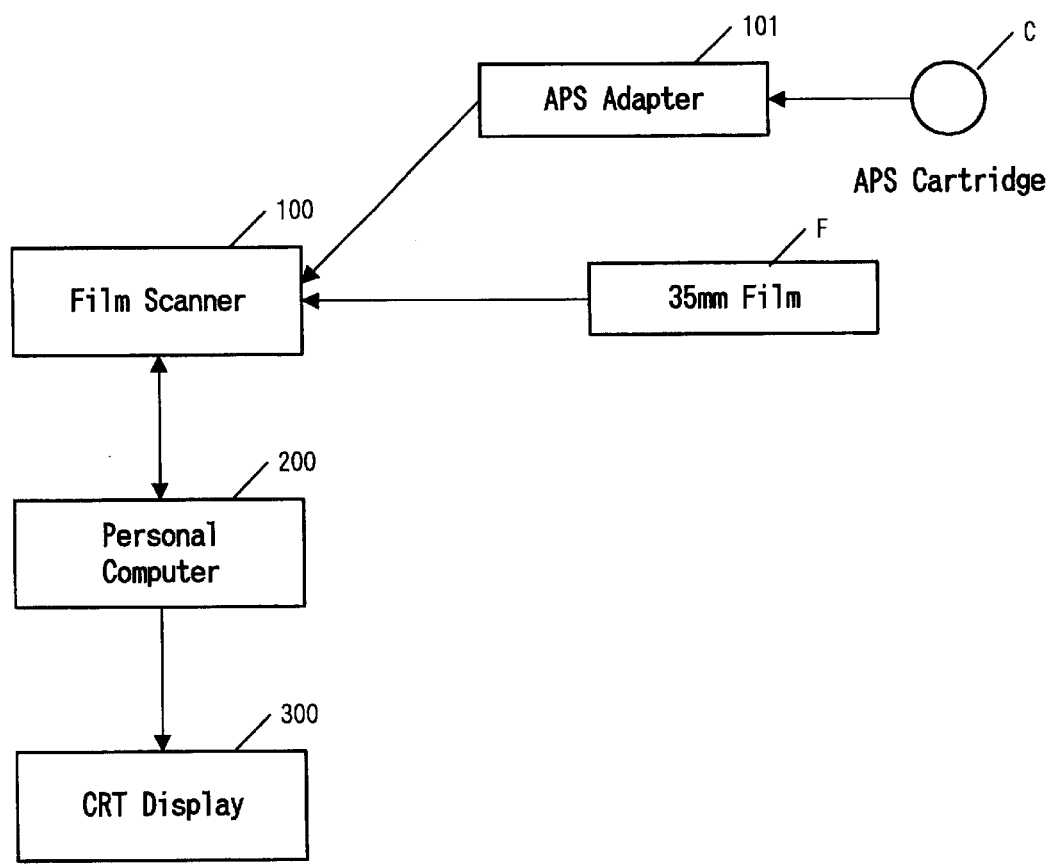
FIG. 1 is a block diagram showing the structure of an image reading system of a first embodiment of the present invention.

FIG. 1 is a block diagram showing the structure of the image reading system including a film scanner of the present embodiment. Referring to FIG. 1, the system comprises a film scanner 100, personal computer 200, and CRT display 300. The film scanner 100 is capable of reading normal 35 mm film F whether positive film or negative film. By installing an APS (advanced photo system) adapter 101 on the film scanner 100, the APS film accommodated in a cartridge C can be read by the film scanner 100.

The film scanner 100 is connected to the personal computer 200 by a general purpose interface such as SCSI (small computer system interface) or the like. The CRT display 300 is connected to the personal computer 200 to display images. Control of the film scanner 100 and various types of image processing including color matching are executed by scanner driver software (hereinafter referred to as "driver") within the personal computer 200. When reading APS film accommodated in the cartridge C, film winding is accomplished using the APS adapter 101.

Figure 2:
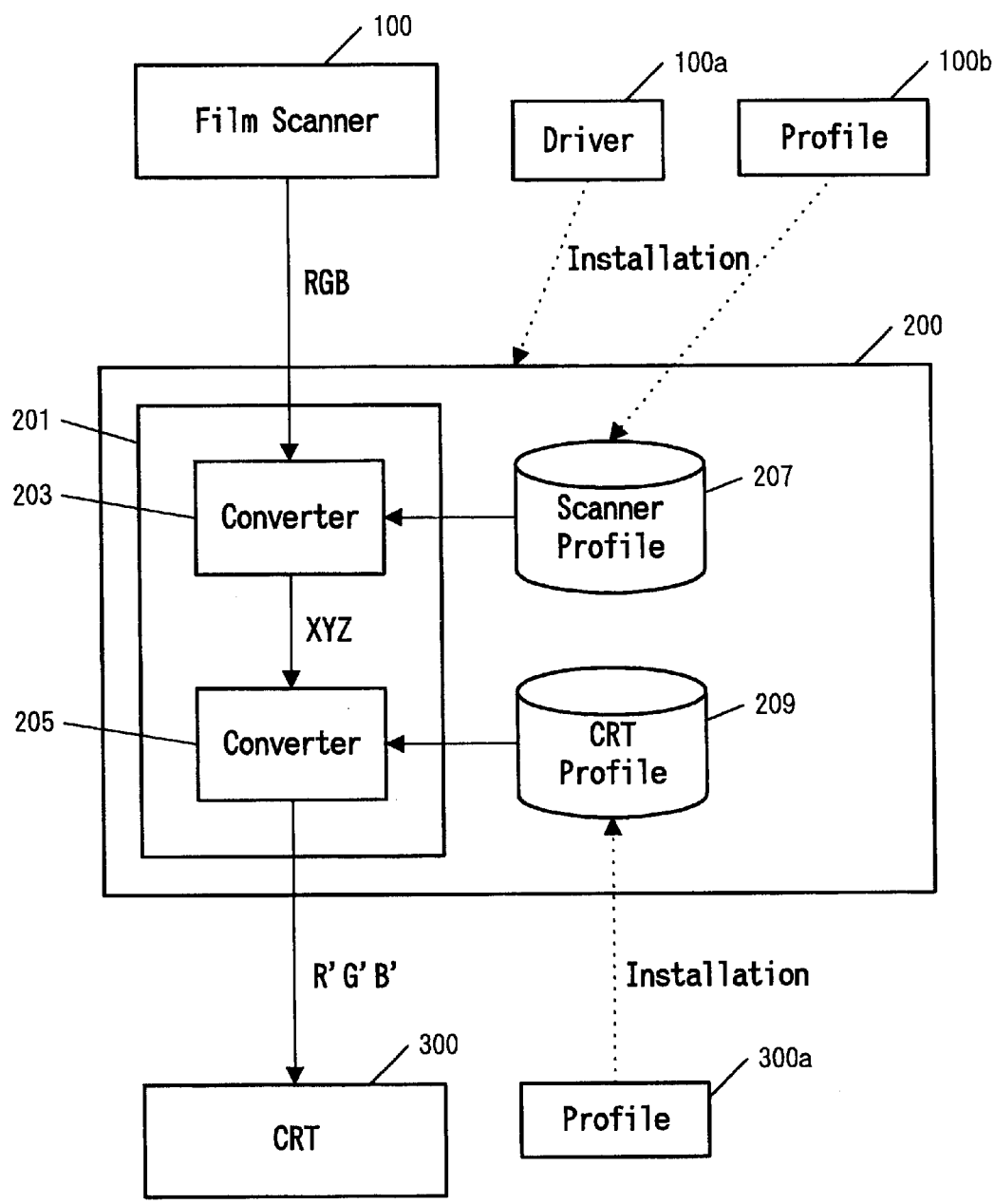
FIG. 2 is a block diagram showing details of the structure of FIG. 1.

FIG. 2 is a block diagram showing the detailed structure of the film scanner 100, personal computer 200, and the CRT display 300. Referring to FIG. 2, the software drive 100a and scanner profile 100b for the film scanner 100 are installed in the personal computer 200. Similarly, software CRT profile 300a for the CRT 300 is installed in the personal computer 200. These software are stored on a recording medium such as a CD-ROM, floppy disk or the like. These software also may be downloaded over a network such as the internet or the like.

The scanner profile 100b is stored as a scanner profile 207 on a recording medium such as a hard disk, RAM or the like in the personal computer 200 via installation. Similarly, the CRT profile 300a is stored as a CRT profile 209 in the personal computer 200.

The driver 100a is similarly stored in the personal computer 200, and operates as the driver 201. The driver 201 has two converters 203 and 205. The converter 203 converts the color information RGB transmitted from the scanner to device-independent value XYZ based on the scanner profile 207. Value XYZ is an XYZ color expression system determined by the CIE (commission International de I' Eclairage).

The converter 205 converts the XYZ value to value R'G'B' corresponding to the color characteristics of the output device (CRT in this case) based on the CRT profile 209. In this way color matching is accomplished.

Figure 3:
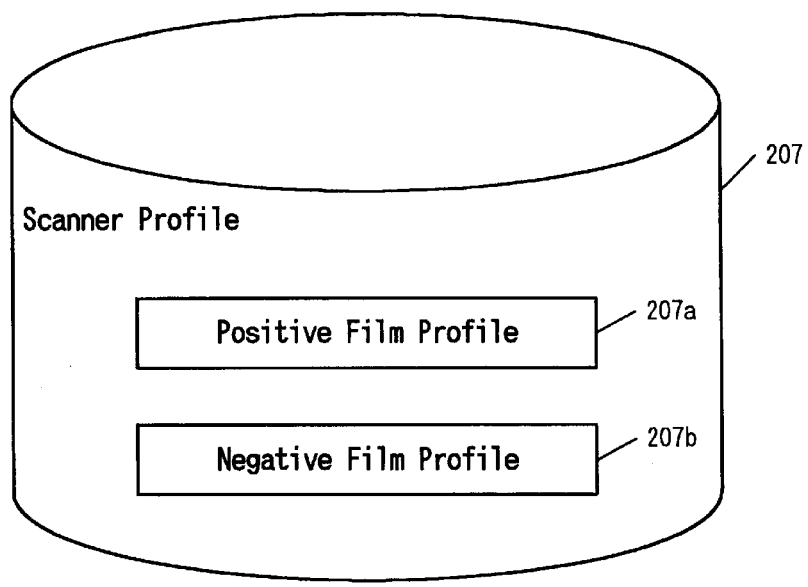
FIG. 3 illustrates the specific structure of scanner profile 207.

FIG. 3 shows details of the structure of the scanner profile 207.

The scanner profile 207 includes positive film profile 207a, and negative film profile 207b (i.e., profiles which target a print image for color matching). The positive film profile 207a is used when the processing object film is a positive film. The negative film profile 207b is used when the processing object film is a negative film.

The positive film profile 207a and the negative film profile 207b respectively include:

(1) information relating to tone (shading);
(2) information relating to color characteristics (i.e., information for converting device (scanner and processing film)-dependent color signal RGB to device-independent color signal (e.g., XYZ)).

Figure 4:
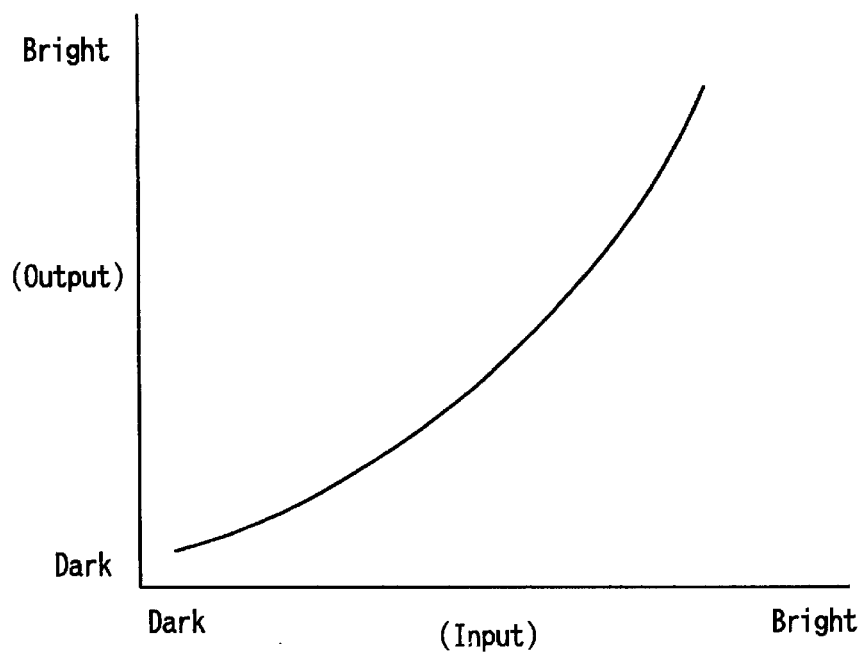
FIG. 4 shows the tone conversion data for positive film.
Figure 5:
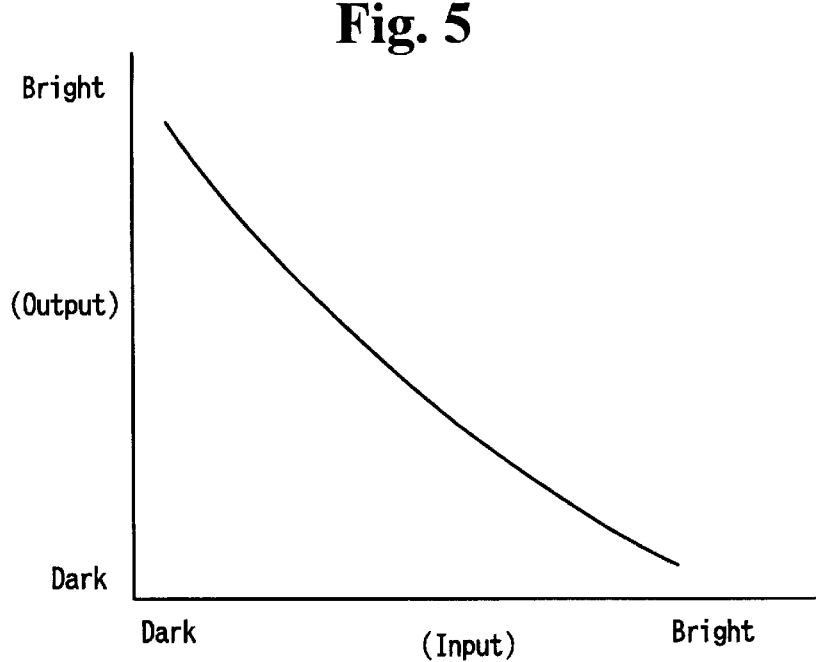
FIG. 5 shows the tone conversion data for negative film.

Information relating to tone is information related to mapping of input shade and output shade represented in FIGS. 4 and 5. The information of FIG. 4 has characteristics in which the output is brightened as the input is brightened, and this information is information for positive film. On the other hand, the information of FIG. 5 has characteristics in which the output is darkened as the input is brightened, and this information is information for negative film.

Figure 6:
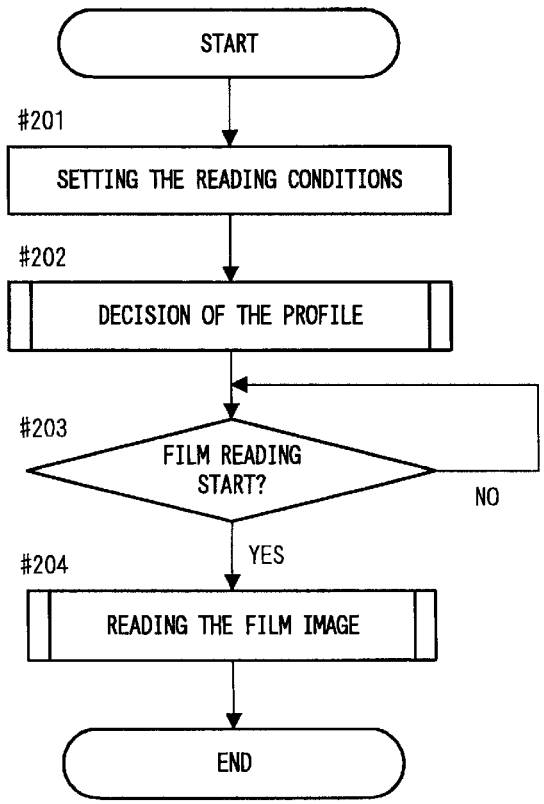
FIG. 6 is a flow chart of the operation of the image reading system of the first embodiment of the present invention.

FIG. 6 is a flow chart showing the operation of the entire system. When the driver starts, the reading conditions are set in step #201. In step #202, the profile to use in color matching is set based on the set reading conditions. Then, in step #203, the start of film reading is awaited, and in step #204 the image is read from the film.

Figure 7:
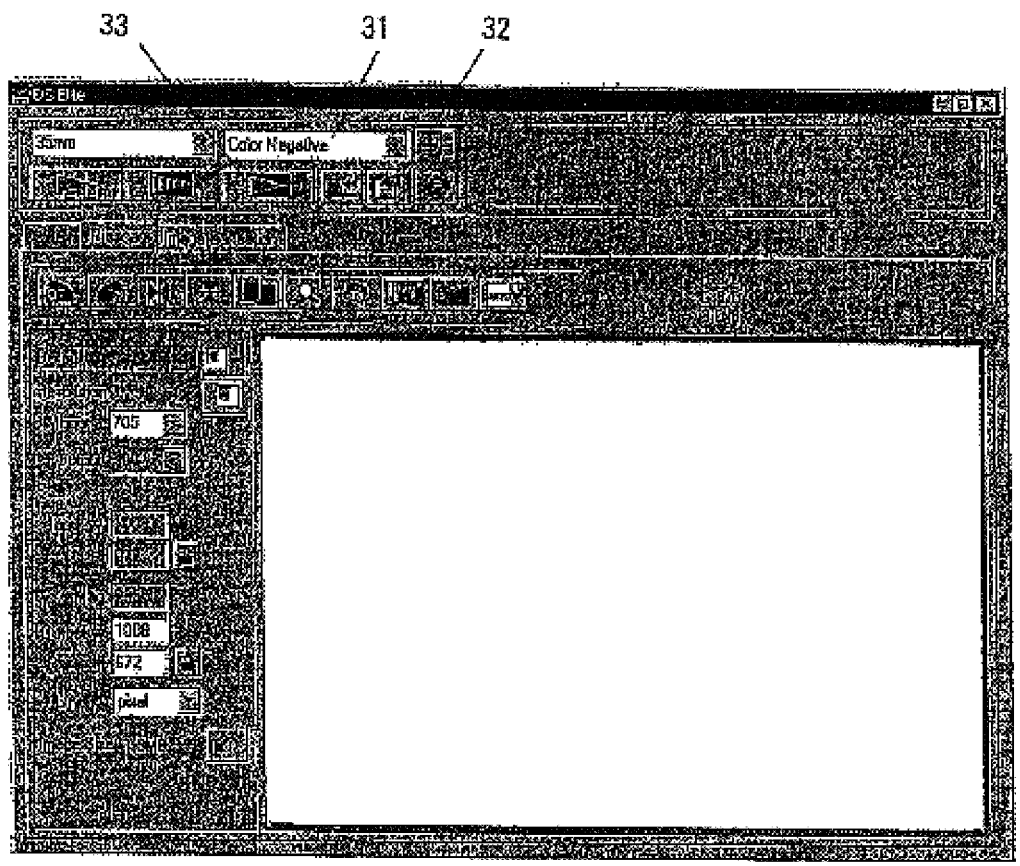
FIG. 7 shows the screen for setting the reading conditions.

FIG. 7 shows a dialog screen displayed on the CRT display 300 in step #201 of FIG. 6. The dialog screen is provided with a read start button 33, a selector 31 for setting the type of reading object film, and an environment setting button 32 for environmental setting.

Figure 8:
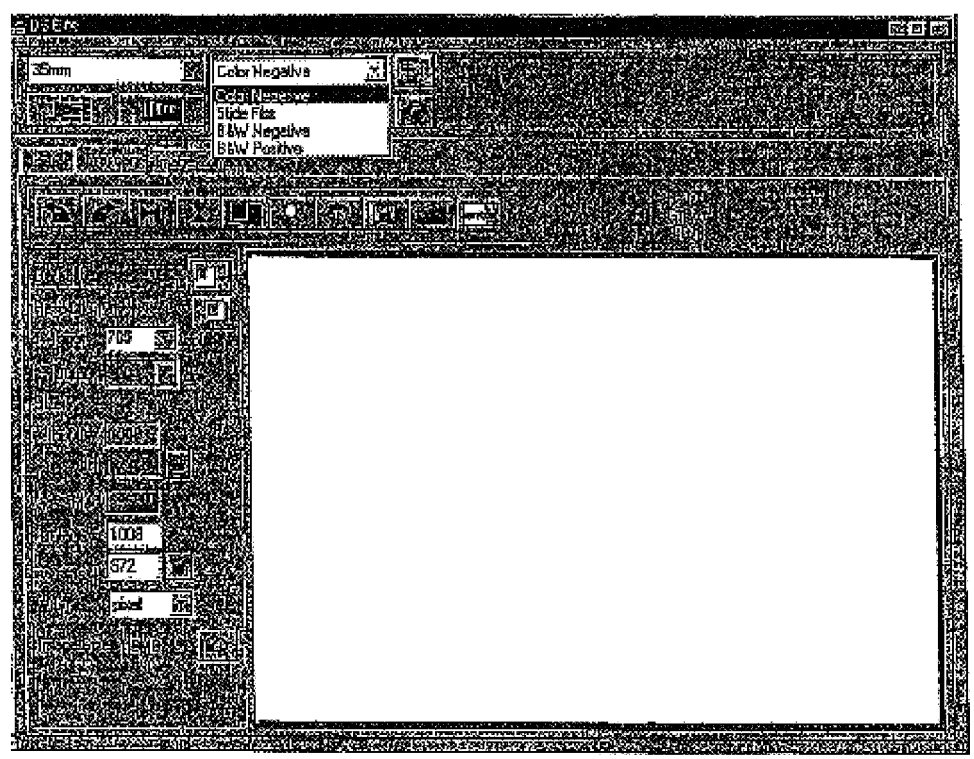
FIG. 8 shows the screen for setting the film type.

FIG. 8 shows the film type selection screen by the film selector 31 of FIG. 7. In the present embodiment, a reading object film can be selected from among "color negative," "color positive," and "monochrome negative" by operating the selector 31. Suitable color matching is executed in accordance with the selected reading object.

Figure 9:
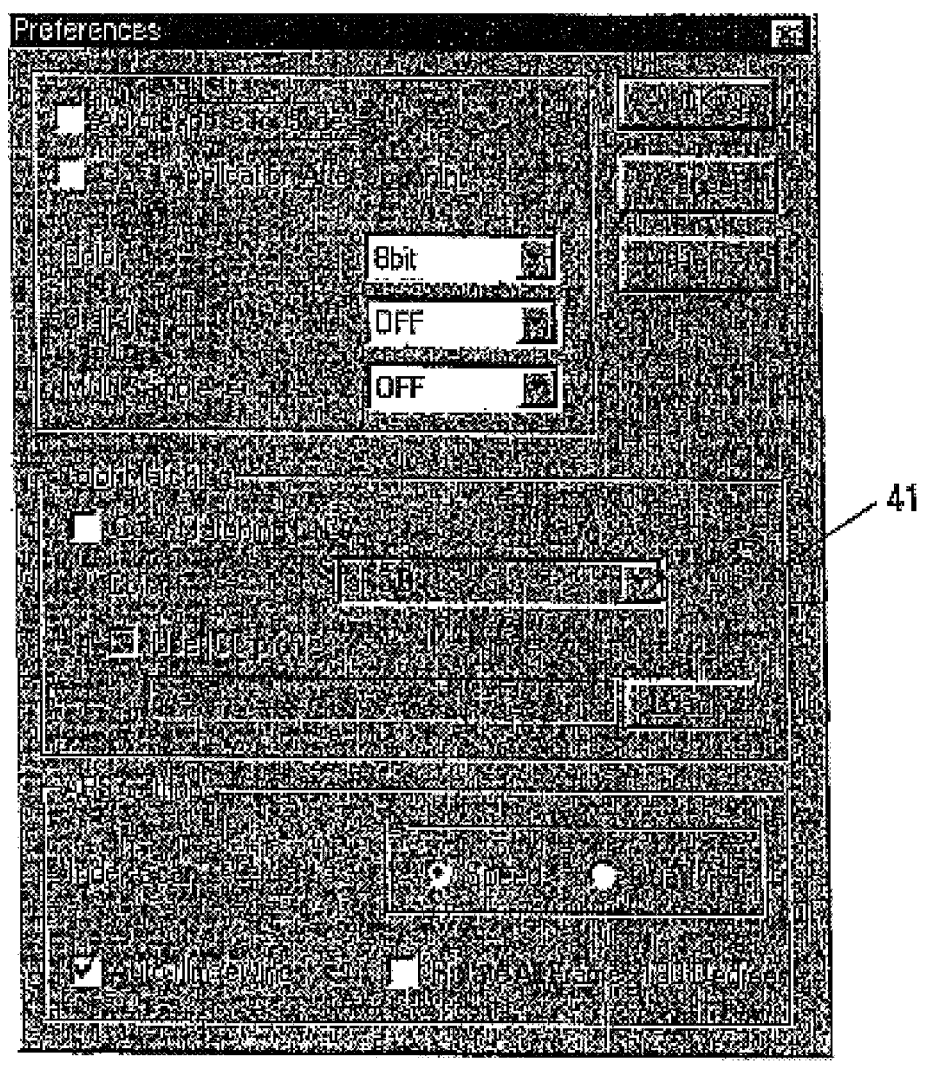
FIG. 9 shows the screen for switching the color matching ON/OFF.

FIG. 9 shows the environment setting button 32 of FIG. 7 in a pressed state. In the environment setting, whether or not to execute the color matching process is determined by the setting portion 41, and whether or not a profile has been selected as the output device profile (CRT 300 in the present embodiment) are determined by setting portion 41.

Figure 10:
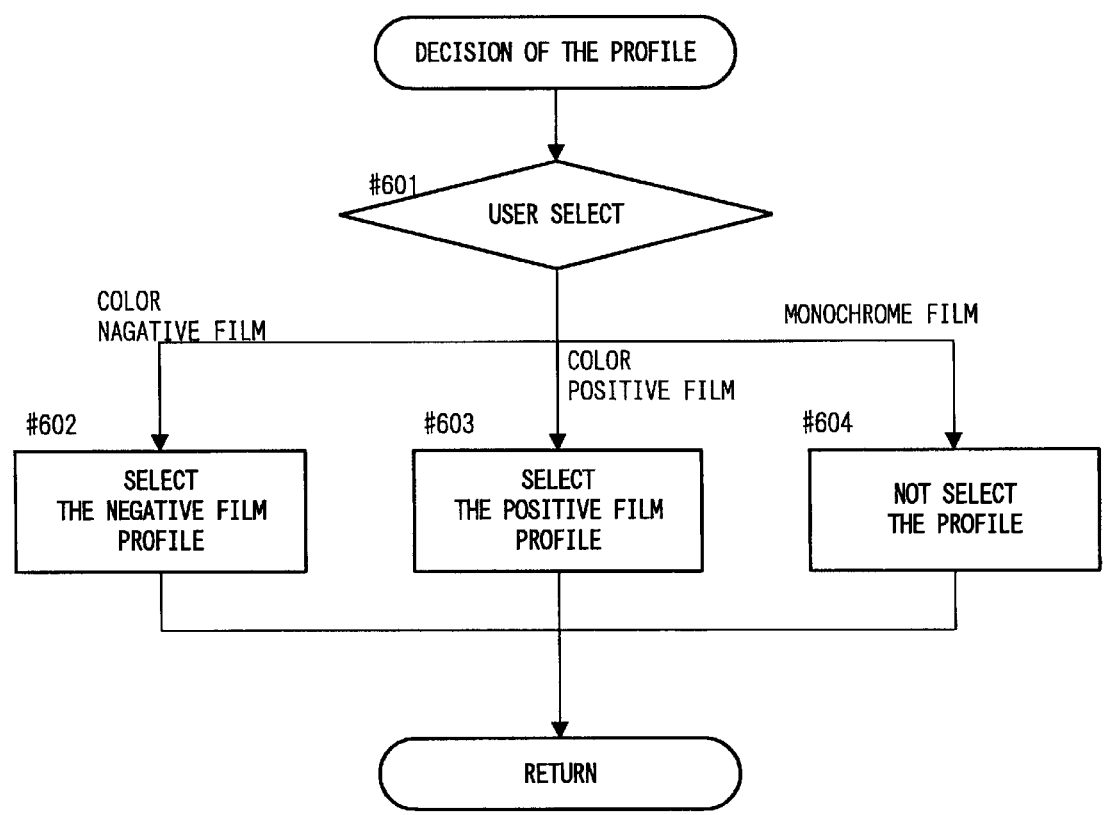
FIG. 10 is a flow chart showing the content of the profile determining process (#202) of FIG. 6.

FIG. 10 is a flow chart showing the content of the profile determining process (#202) of FIG. 6.

Referring to FIG. 10, whether or not the reading object selected by the operation of the selector 31 by a user in step #601 is a color negative, or color positive, or monochrome film is discriminated. Then, based on the discrimination result, a determination is made as to whether or not the negative film profile 207b is selected (#602), the positive film profile 207a is selected (#603), or the no profile is selected (#604).

Figure 11:
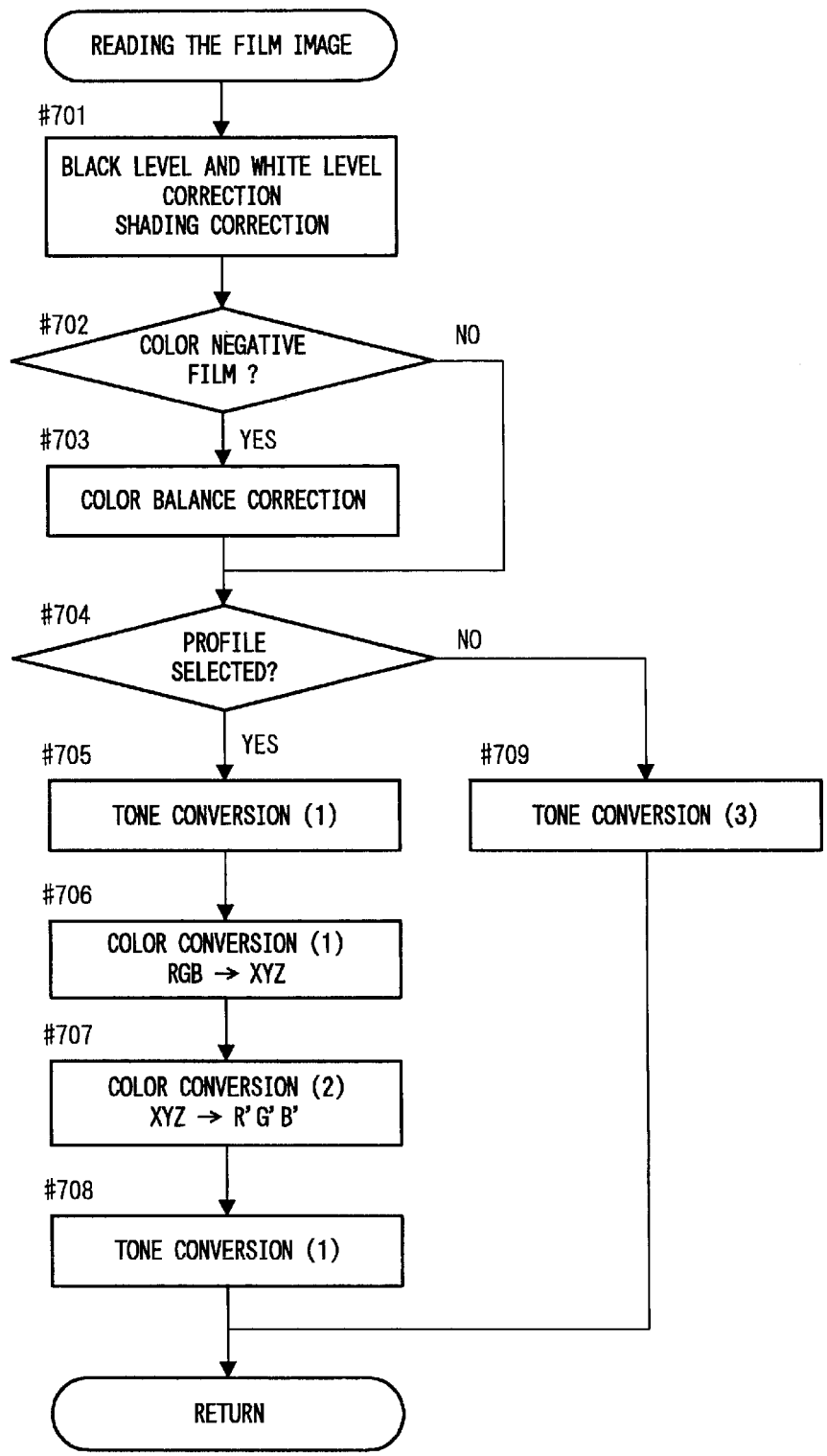
FIG. 11 is a flow chart showing the content of the image reading process (#204) of FIG. 6.

When the user presses the read button 33 and the reply to the query of step #203 is YES, image reading is executed in step #204 of FIG. 6. During the image reading, the flow chart shown in FIG. 11 is executed. Description of the detailed operation of the image reading (e.g., mechanical controls and the like) is omitted inasmuch as it is not directly related to the present invention.

Referring to FIG. 11, image data are sequentially read from a CCD within the film scanner 100, and in step #701 the read RGB data are subjected to white level and black level correction. Then, processes are executed such as shading correction of the CCD pixel dispersion of the optical system.

Next, in step #702, a determination is made as to whether or not the film type selected by the user is color negative film. If color negative film has been selected, a color balance correction process is executed in step #703. In all other cases, the process of step #703 is not executed.

In step #704, a determination is made as to whether or not the color matching profile has been selected in either step #602 or #603 of FIG. 10. When a color matching profile has been selected, other processes are executed in step #705 and subsequent steps, whereas if a profile has not been selected the routine advances to step #709.

In step #705, tone data (information relating to tone) are read from the selected profile data, and tone conversion is executed in accordance with these data. These data specifically comprise look-up table data describing the input/output relationship, and read data are converted in accordance with this table.

As shown in FIGS. 4 and 5, tone characteristics for negative film are recorded such that the greater the input value, the smaller the output value. Conversely, positive film characteristics are recorded such that the greater the input value, the greater the output value. Furthermore, since the tone characteristics of the film itself do not have a simple inverse relationship between positive film and negative film, the tone data reflect the tone characteristics of the film itself.

In step #706, the tone converted data are subjected to color conversion by equation (1) in accordance with a color conversion matrix coefficient (information relating to color characteristics) stored in the selected profile. In this way the RGB value is converted to device-independent XYZ value (a value of the XYZ color expression system of the CIE).

In step #707, a matrix coefficient representing the color characteristics of the output device are read from the profile data of the set output device (CRT), and converted from the XYZ value to R'G'B' value via conversion by equation (2).

$$\begin{pmatrix} X \\ Y \\ Z \end{pmatrix} = \begin{pmatrix} a11 & a12 & a13 \\ a21 & a22 & a23 \\ a31 & a32 & a33 \end{pmatrix} \times \begin{pmatrix} R \\ G \\ B \end{pmatrix} \quad (1)$$

$$\begin{pmatrix} R' \\ G' \\ B' \end{pmatrix} = \begin{pmatrix} b11 & b12 & b13 \\ b21 & b22 & b23 \\ b31 & b32 & b33 \end{pmatrix} \times \begin{pmatrix} X \\ Y \\ Z \end{pmatrix} \quad (2)$$

In step #708, the output device tone characteristics are read from the output device profile data, and tone characteristic conversion is executed based on the output device data. This process also uses a look-up table similar to step #705.

On the other hand, when a profile is not selected in step #704 (i.e., when the processing object is monochrome film), only tone conversion similar to when conventional color matching is not performed is executed in step #709. Details of this process are omitted since they are not directly related to the present invention.

The data obtained by the aforesaid process are color matched to colors used when displaying on the output device.

In this way suitable color matching is performed by selecting a suitable profile in accordance with the type of film (negative, positive, monochrome) in the present embodiment.

Second Embodiment

In the second embodiment, a color matching process is not performed when the film scanner reads a color negative film. In the case of negative film, the print image is suitable as the color matching target as described above, but the case wherein the negative film is only read and not printed also needs consideration. In such an instance, it is desirable to reduce the calculation load inasmuch as the color matching process is ineffective so as to achieve higher speed reading than when performing device-independent color matching.

Figure 12:
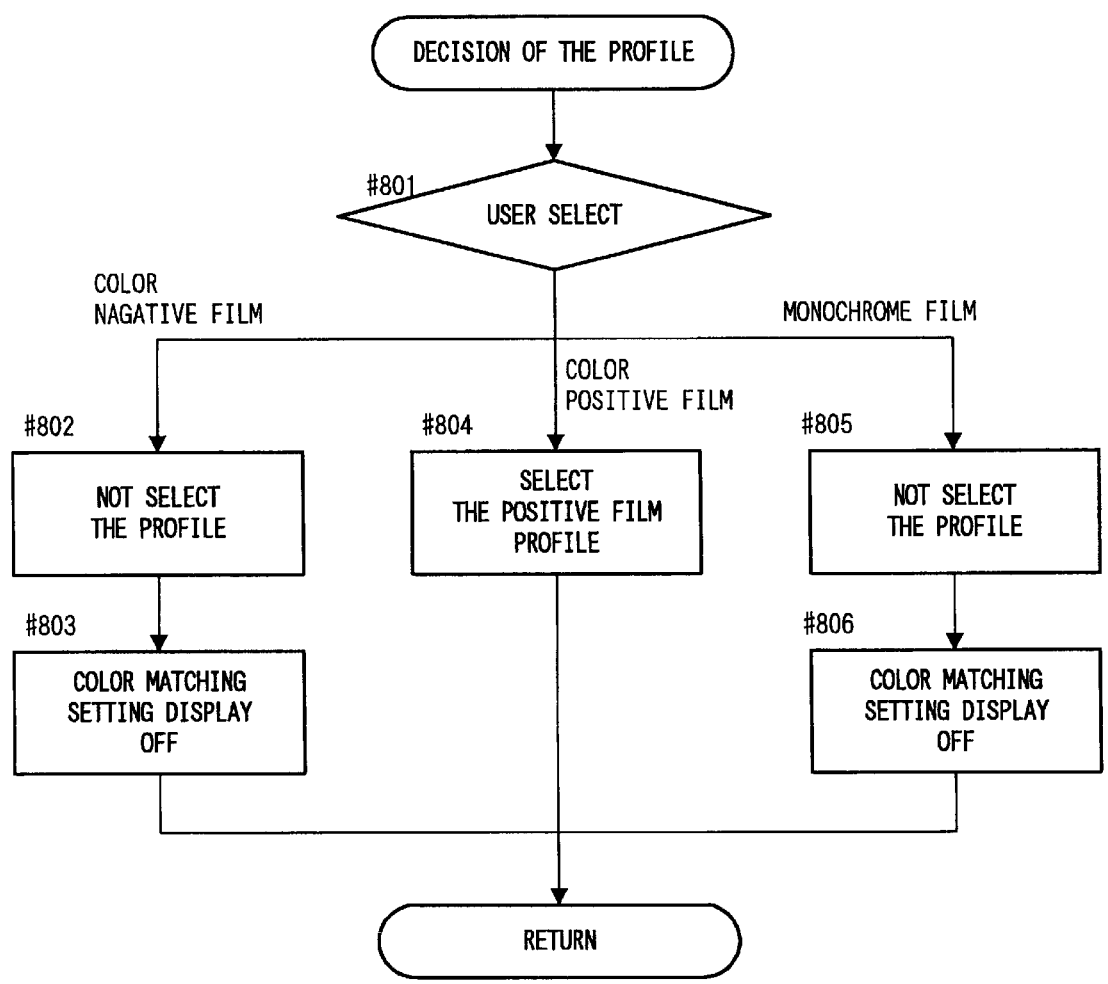
FIG. 12 is a flow chart showing the content of the profile determining process of a second embodiment of the present invention.

In the present embodiment, the flow chart shown in FIG. 12 is executed as a profile determining process in place of the flow chart shown in FIG. 10. That is, in step #801 the content set by the user is determined, and if color negative film has been specified, the profile is not selected in step #802, and the color matching setting display (setting portion 41 in FIG. 9) is erased (turned OFF) in step #803.

If color positive film has been specified by the user, the positive film profile is selected in step #804. If monochrome film has been specified by the user, the profile is not selected in step #805, and the color matching setting display is erased in step #806.

Third Embodiment

In the third embodiment, when a monochrome film is the object of reading by the film scanner, a conversion process using profile data is executed. The profile data used for monochrome film are tone data for inverting shading, and data not subject to color conversion in equation (1) (specifically, a unit matrix).

Figure 13:
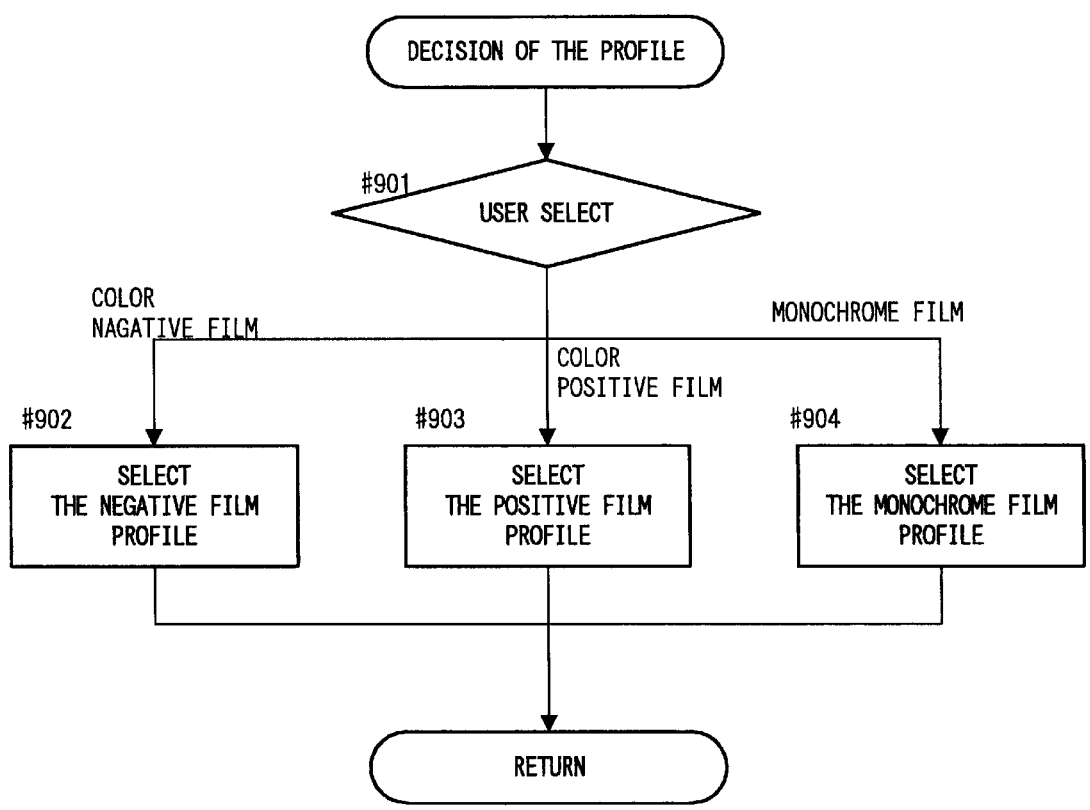
FIG. 13 is a flow chart showing the content of the profile determining process of a third embodiment of the present invention.

Specifically, in the present embodiment the flow chart shown in FIG. 13 is executed in place of the flow chart shown in FIG. 10. Referring to FIG. 13, in step #901 the settings specified by the user are discriminated, and when color negative film has been specified, the negative film profile is selected in step #902. On the other hand, when color positive film has been specified, the positive film profile is selected in step #903. Furthermore, when monochrome film has been specified, the monochrome film profile is selected in step #904.

Fourth Embodiment

In the fourth embodiment, when reading APS film, information differentiating negative, positive, and monochrome recorded on the film is read, and a profile is selected based on the reading result.

Figure 14:
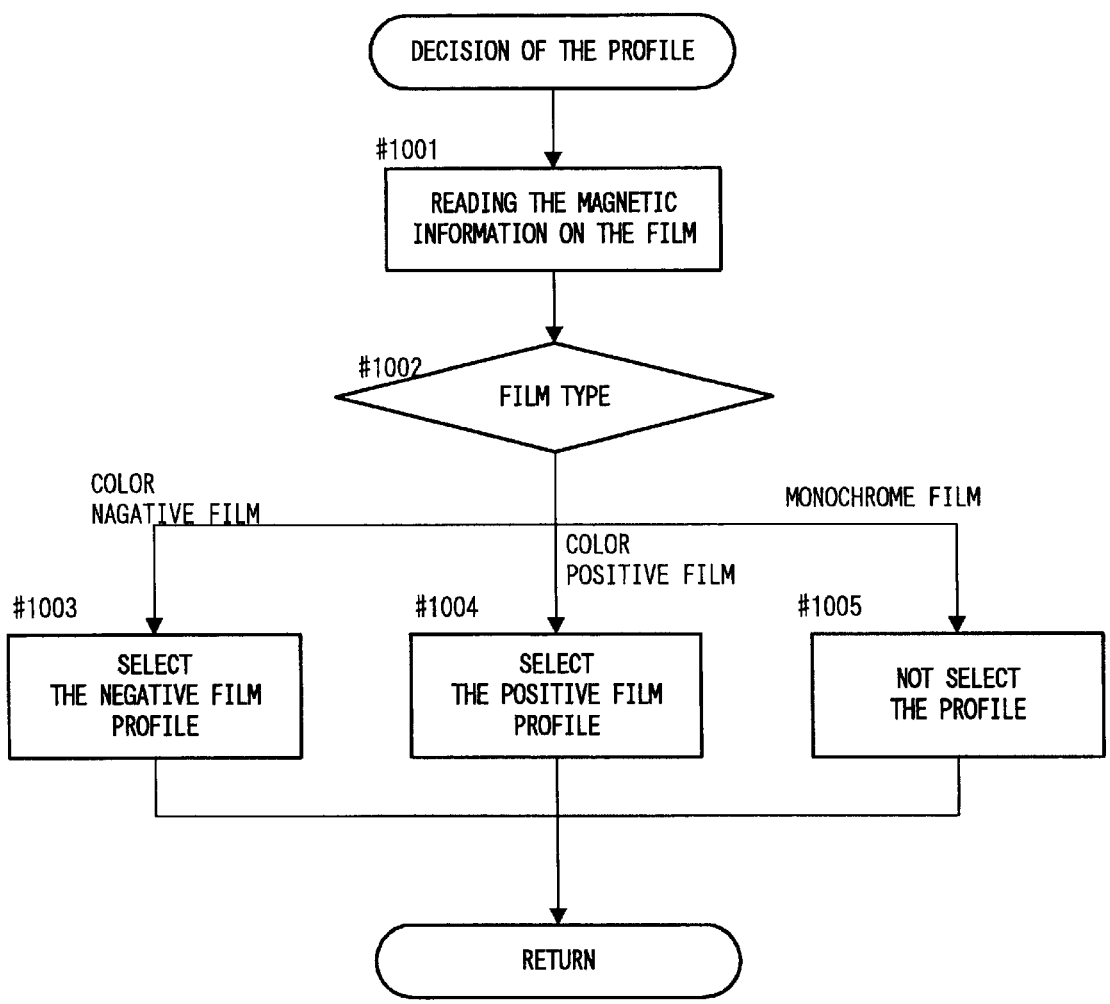
FIG. 14 is a flow chart showing the content of the profile determining process of a fourth embodiment of the present invention.

Specifically, the flow chart shown in FIG. 14 is executed in place of the flow chart of FIG. 10.

Referring to FIG. 14, in step #1001, the APS film accommodated in the cartridge C is read via the APS adapter 101. At this time, the images are read as the film frames are automatically advanced by the APS adapter 101. The APS adapter 101 is provided with a magnetic head, so as to be capable of scanning and reading magnetic information on the film as the film is advanced.

In step #1002, the film type is discriminated based on the read magnetic information. When the discrimination result indicates a color negative film, color positive film, or monochrome film, the negative film profile is selected (#1003), the positive film profile is selected (#1004), the film profile is not selected (#1005), respectively.

Fifth Embodiment

In the fifth embodiment, information representing a brand of the film recorded on the film is read when an APS film is read, and a profile is selected based on the information of film brand. In the present embodiment, more suitable color matching is accomplished because a suitable profile can be selected in accordance with the film characteristics.

Figure 15:
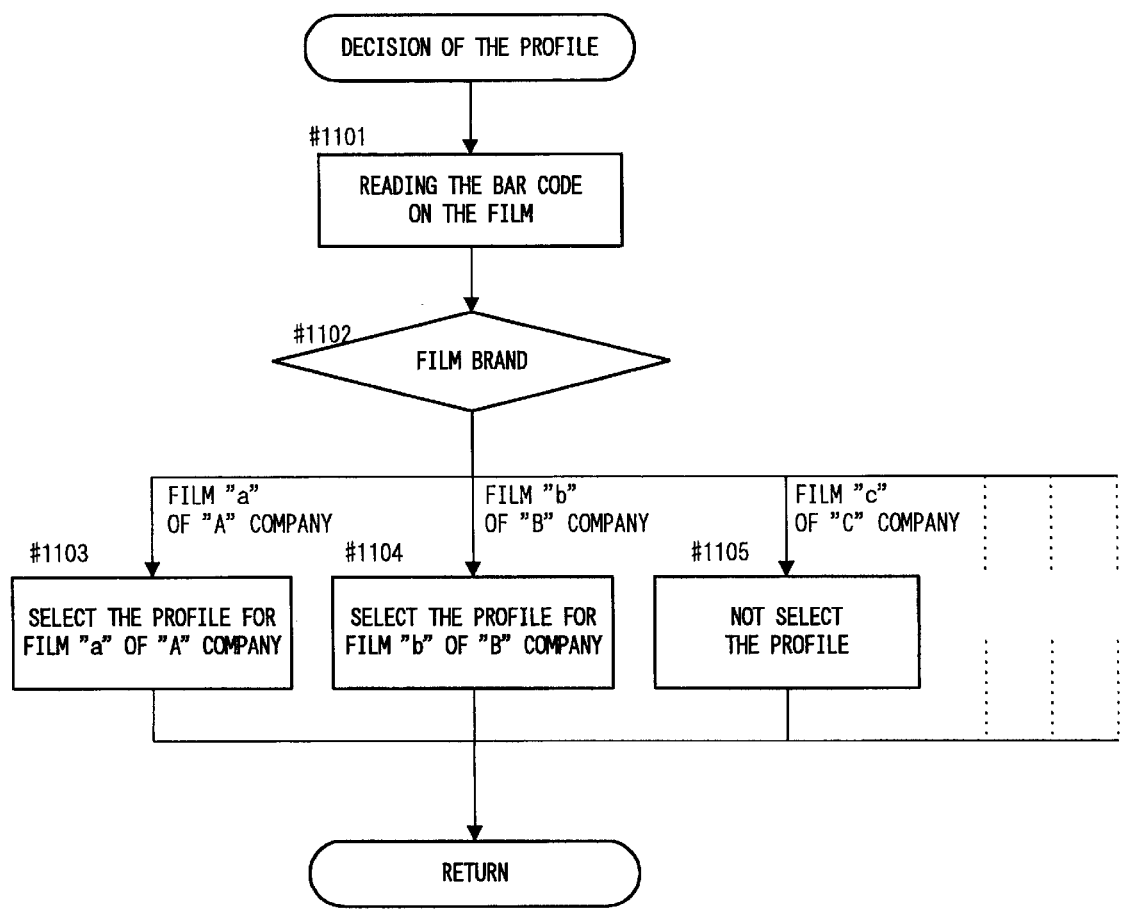
FIG. 15 is a flow chart showing the content of the profile determining process of a fifth embodiment of the present invention.

Specifically, the flow chart shown in FIG. 15 is executed in place of the flow chart of FIG. 10. Referring to FIG. 15, in step #1101, a bar code (latent image) recorded on the APS film is read. Then, in step #1102, the film brand is specified, and the film brand profile is selected in steps #1003–1005. The profiles varying by film brand naturally record tone characteristics of negative film for negative film, and record tone characteristics of positive film for positive film. For this reason suitable processing is executed for negative film, positive film, and monochrome film, respectively, simply by specifying the film brand.

The film brand also may be selected by the user.

Sixth Embodiment

In the sixth embodiment, when a color negative film or monochrome film is read, it is impossible to set color matching by the setting portion 41 (FIG. 9). Specifically, the impossibility of the setting is made known to the user by the display of the setting portion 41 of FIG. 9 which is gray, therefore it is impossible to operate the setting portion 41.

Figure 16:
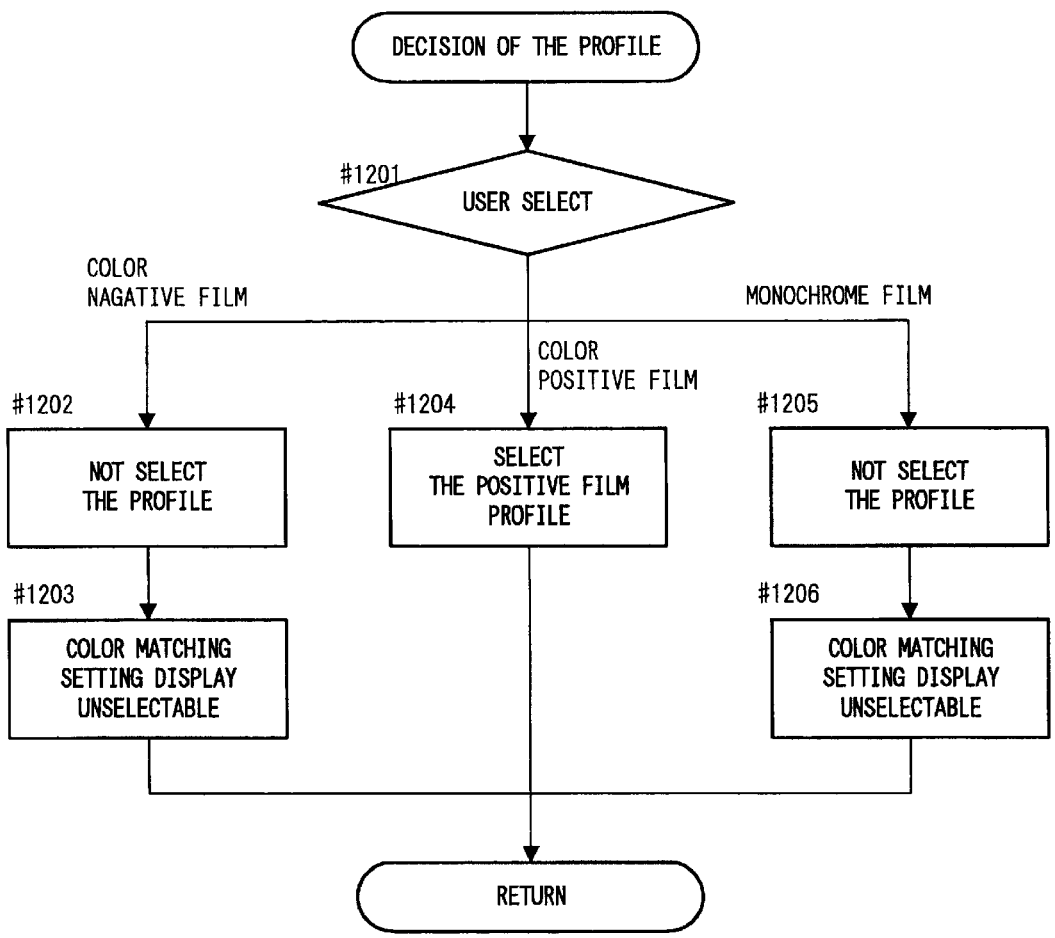
FIG. 16 is a flow chart showing the content of the profile determining process of a sixth embodiment of the present invention.

Specifically, the flow chart of FIG. 16 is executed in place of the flow chart of FIG. 10.

Referring to FIG. 16, in step #1202, when the setting set by the user is discriminated, if color negative film is selected, then in step #1202 a profile is not selected, and in step #1203 the color matching setting display (setting portion 41) becomes unselectable.

When color positive film is selected, in step #1204 the positive profile is selected. When monochrome film is selected, in step #1205 a profile is not selected, and in step #1206, the color matching setting display becomes unselectable.

Seventh Embodiment

In the seventh embodiment, a profile is not selected when the reading object is a color negative film or a color positive film even when, for example, the user specifies color matching via the setting portion 41, and color matching is not executed.

Figure 17:
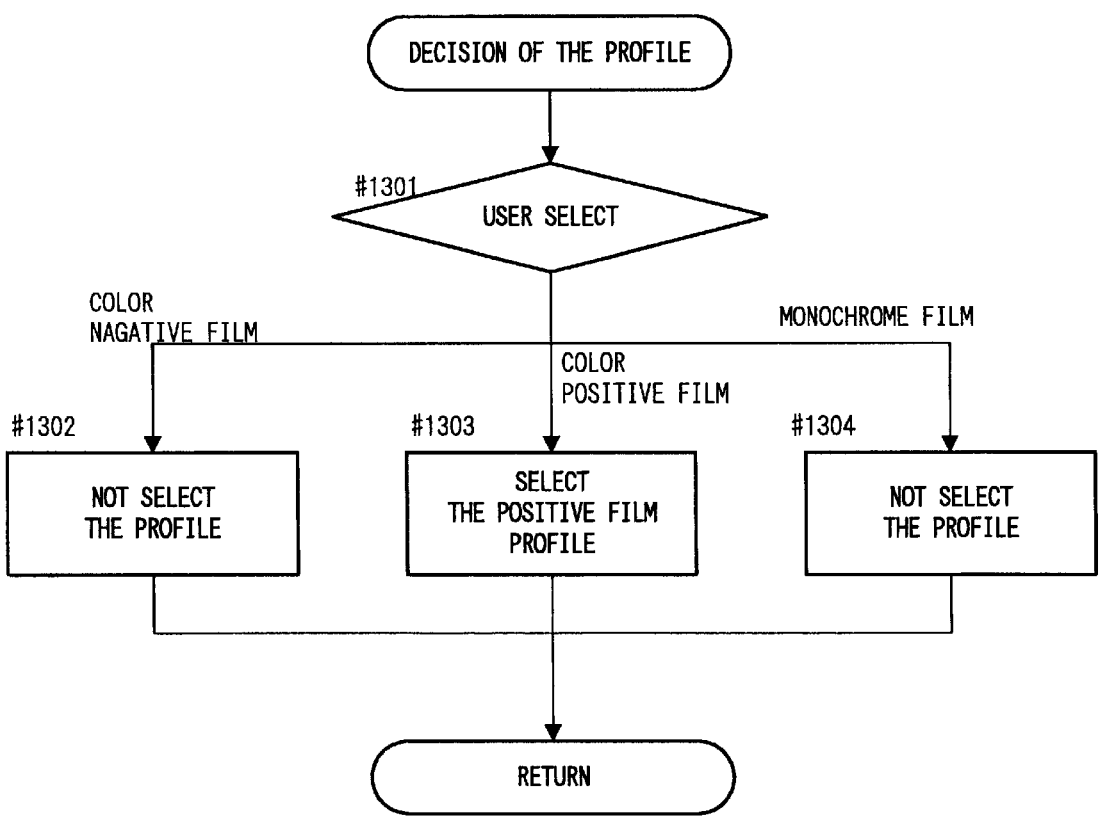
FIG. 17 is a flow chart showing the content of the profile determining process of a seventh embodiment of the present invention.

Specifically, the flow chart of FIG. 17 is executed in place of the flow chart of FIG. 10.

Referring to FIG. 17, in step #1301 the setting set by the user is discriminated, and if a color negative film has been set, in step #1302 a profile is not selected regardless of input of the setting portion 41. If color positive film has been set, in step #1303 the positive profile is selected. If monochrome film has been set, in step #1304 no profile is selected regardless of the input of the setting portion 41.

Other

Although the type of film is discriminated by input from a user in the first through third and sixth and seventh embodiment, the film type also may be discriminated automatically. Specifically, the film type may be discriminated by executing image processing after prescanning the film, or may be determined based on the color of the member forming the film base (transparent for positive film, orange for negative film).

Other Structural Examples of the Invention

Consider the following structure based on the previously described embodiments.

(1) A film scanning system which changes the color matching processing method according to the type of film to be processed.

(2) The aforesaid film scanning system, wherein color matching is performed from a color negative film to a print image on paper when color negative film is the processing object.

(3) The aforesaid film scanning system, wherein color matching is not performed when color negative film is the processing object.

(4) The aforesaid film scanning system, wherein color matching is not performed when monochrome film is the processing object.

(5) A film scanning system, in which, in accordance with a user setting color negative film, color positive film, or monochrome film, an image on color positive film is set as a color matching target when color positive has been set, a print image on paper is set as a color matching target from color negative film when color negative has been set, and no color matching is set when monochrome has been set.

(6) A film scanning system, in which, in accordance with a user setting color negative film, color positive film, or monochrome film, a processing method is used to set an image on color positive film as a color matching target when color positive has been set, and a processing method is used which does not perform color matching when color negative film or monochrome film has been set.

(7) A color matching method, in which two types of device profiles are used for color negative film and color positive film, and the profiles are used selectively in accordance with color negative film or color positive film set by the user.

(8) A color matching method, in which the color negative film profile records data for color conversion used for color matching from negative film to a printed image on paper.

(9) A color matching method, in which the color negative film profile records tone conversion data for inverting of reversed shading of negative film.

(10) A color matching method, in which the color negative film profile includes conversion data not subjected to color conversion.

(11) A color matching method, in which the device profile is in a format determined by the ICC.

(12) A color matching method, in which the processes using the profile are performed on data subjected to color balance correction on color negative film.

(13) A color matching method, in which three types of device profiles are used for color negative film, color positive film, and monochrome film, and the profiles are used selectively in accordance with the setting of color negative film, color positive film, or monochrome film by the user.

(14) A color matching method, in which the monochrome film profile records tone conversion data inverting tones of reversed shading of negative film, and data not subjected to color conversion.

(15) A color matching method, in which the monochrome film profile is a monochrome input profile determined by ICC.

(16) A color matching method, in which a plurality of device profiles differentiated by film brand are prepared, and the profile used is selected in accordance with film brand set by the user.

(17) A color matching method having a step of detecting the type of film as color negative, color positive, monochrome, wherein the processing is automatically selected in accordance with the detection result.

(18) A color matching method having a step of detecting a film brand, wherein the processing is automatically selected in accordance with the detection result.

(19) A color matching method, in which the color matching set state is automatically switched to OFF when color negative film or monochrome film is the processing object.

(20) A color matching method, in which the color matching ON state is unselectable when color negative film or monochrome film is the processing object.

(21) A color matching method, in which the color matching process is not actually executed even when color matching is set to the ON state when color negative film or monochrome film is the processing object.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A film scanning system comprising:
   a film scanner for scanning an image recorded on the film;
   a discriminator for discriminating a type of film;
   a memory storing a plurality of film profiles;
   a selector for selecting one of the plurality of stored film profiles for use in color matching based on the discrimination result of the discriminator; and
   an image processor for performing the color matching based on the selected film profile, wherein
   each of the stored film profiles represents at least a characteristic of the film scanner.

2. The film scanning system as claimed in claim 1, wherein said characteristic is information relating to tone and color.

3. The film scanning system as claimed in claim 2, wherein said image processor performs a tone conversion and a color conversion for color matching.

4. The film scanning system as claimed in claim 1, wherein said discriminator discriminates whether the film is a positive film, or a negative film, or a monochrome film.

5. The film scanning system as claimed in claim 4, wherein said image processor does not perform color matching when the film is discriminated as negative film by the discriminator.

6. The film scanning system as claimed in claim 1, wherein said discriminator discriminates the brand of the film.

7. A storage medium on which is stored a program implementing the steps of:
   discriminating a type of film to be scanned;
   selecting one of a plurality of stored film profiles for use in color matching based on the discrimination result of the discrimination step; and
   scanning an image recorded on the film; and
   performing the color matching based on the film profile selected in the selection step, wherein
   each of the stored film profiles represents at least a characteristic of the film scanner.

8. A film scanner connectable to an image processing apparatus having a discriminator for discriminating a type of film, a memory storing a plurality of film profiles, a selector for selecting one of the plurality of stored film profiles for use in color matching based on the discrimination result of the discriminator, and an image processor for performing the color matching based on the selected film profile, comprising:
   a reader for reading an image recorded on the film; and
   an interface for outputting the read image data to the image processing apparatus, wherein
   each of the stored film profiles represents at least a characteristic of the film scanner.

9. The film scanning system as claimed in claim 8, wherein said characteristic is information relating to tone and color.

10. The film scanner as claimed in claim 9, wherein said image processor performs a tone conversion and a color conversion for color matching.

11. The film scanner as claimed in claim 8, wherein said discriminator discriminates the brand of the film.

12. The film scanner as claimed in claim 8, wherein said discriminator discriminates whether the film is a positive film, or a negative film, or a monochrome film.

13. The film scanner as claimed in claim 12, wherein said image processor does not perform color matching when the film is discriminated as negative film by the discriminator.

14. A color matching method of a film scanning system comprising the steps of:
   discriminating a type of film to be scanned;
   selecting one of a plurality of stored film profiles for use in color matching based on the discrimination result of the discriminating step;
   scanning an image recorded on the film; and
   performing the color matching based on the film profile selected in the selection step, wherein
   each of the stored film profiles represents at least a characteristic of the film scanner.

* * * * *